3,288,780
PROCESS FOR PREPARING 5'-RIBONUCLEOTIDES

Yoshio Tsuchiya, Yokohama-shi, Kanagawa-ken, Tadao Takenishi, Tokyo, Tetsuya Kato, Kawasaki-shi, Kanagawa-ken, Nobutoshi Muramatsu and Hisao Mori, Tokyo, and Masaharu Yoshikawa and Takehiko Ichikawa, Yokohama-shi, Kanagawa-ken, Japan, assignors to Ajinomoto Co., Inc., Tokyo, Japan
No Drawing. Filed Feb. 25, 1964, Ser. No. 347,115
Claims priority, application Japan, Jan. 30, 1962, 37/2,561; Apr. 11, 1962, 37/13,712; Sept. 10, 1962, 37/38,473; Nov. 21, 1962, 37/50,964
9 Claims. (Cl. 260—211.5)

This application is a continuation-in-part of our co-pending application Serial Number 254,588, filed on January 29, 1963, and now abandoned.

This invention relates to a process for preparing 5'-ribonucleotides, and more particularly to the phosphorylation of ribonucleosides whose hydroxyl groups in positions 2' and 3' are protected by substituents.

The primary object of the invention is a process which permits the afore-mentioned phosphorylation to be carried out conveniently, economically, and at good yields on an industrial scale.

We have found that phosphorus oxychloride or phosphoryl chloride, $POCl_3$, may be employed in a novel manner as a phosphorylation agent for the 2',3'-O-protected ribonucleosides under conditions meeting the requirements of industrial practice.

Phosphoryl chloride has been widely used as a reagent and solvent in the preparation of phosphate esters of phenols and alcohols. However, prolonged refluxing is generally required, which would be deleterious to ribonucleotides. In the reaction between aliphatic alcohols and phosphoryl chloride, the presence of a base, such as a tertiary amine has been considered necessary for accepting the HCl formed which would otherwise react with alkyl phosphate to form alkyl chloride.

Pyridine has been commonly used as an HCl acceptor in the phosphorylation of nucleosides by $POCl_3$. When pyridine is used as solvent and HCl acceptor the phosphorylating must be carried out at very low temperatures, typically $-20$ to $-30°$ C.

It is not economically feasible to apply this known procedure to industrial production. It is difficult and expensive to maintain a very low temperature during phosphorylation. The unavoidable recycling of the expensive pyridine solvent further increases the cost. The conventional method moreover produces mixtures of mono- and di-esters of phosphoric acid and polyphosphates. Phosphorus oxychloride therefore was not employed heretofore for the phosphorylation of 2',3'-O-substituted nucleosides on an industrial scale.

We have found that this phosphorylation can be carried out under convenient conditions if phosphoryl chloride itself is used as the solvent. An industrially useful phosphorylating procedure that can be performed under very simple operating conditions has been developed by us on the basis of these findings.

Generally, free nucleosides are only sparingly soluble in phosphoryl chloride at room temperature. However, we have found that 2',3'-O-alkylidene nucleosides dissolve slowly in phosphoryl chloride in the absence of a base as they react with the phosphoryl chloride, and clear solutions are obtained after a few hours at room temperature. Small amounts of moisture promote the reaction which proceeds to the exclusive formation of the 5'-mono phosphate in a high yield.

The process of the invention is widely applicable to the 2',3'-O-alkylidene nucleosides including those which contain an amino or hydroxyl group in the 2-position in a purine or pyrimidine radical. The 5'-hydroxyl group in the nucleosides which have an amino or hydroxyl group in the 2-position in a purine or pyrimidine group is not reactive and resists phosphorylation with phosphoryl chloride in pyridine. We have succeeded in phosphorylating guanosine, xanthosine, and uridine with uniformly excellent yields. Our process is carried out in an acidic reaction medium. It is believed that the normal reactivity of the 5'-hydroxyl group is restored by the protonation of the purine or pyrimidine base. The reaction, and the further processing of the reaction mixture can be carried out in a simple and convenient manner. The yields are almost quantitative.

The reaction is preferably carried out at a temperature between $0°$ and $30°$ C. A small amount of metal halide accelerates the reaction. Inert gases or air may be passed through the reaction mixture to remove the hydrogen chloride produced in the reaction.

The 2',3'-O-substituted ribonucleoside which is to be phosphorylated is dissolved in phosphoryl chloride which may contain small amounts of water, of partially hydrated phosphoryl chloride, of an aliphatic alcohol having 1–5 carbon atoms or of phosphoryl chloride partly substituted by such an alcohol. The solution is kept at a temperature between $0°$ and $30°$ C. until the corresponding 2',3' - O - substituted ribonucleoside-5'-phosphorodichloridate is formed, and the latter is then hydrolyzed.

Phosphoryl chloride hydrated with one to two equivalents of water has been previously employed as a phosphorylating reagent. However, when hydrated phosphoryl chloride is applied to nucleosides, the yield of nucleotides is very low, and most of the nucleoside is decomposed to its base and sugar components.

When a large excess of phosphoryl chloride containing a small amount of partially hydrated phosphoryl chloride is employed as a solvent and phosphorylating reagent, nucleosides are phosphorylated to nucleotides in high yields. For instance, 0.01 mole water may be added to one mole of phosphoryl chloride. As the required amount of water is small, moisture or a trace of water in the starting materials is adequate.

When partially hydrated phosphoryl chloride is separately prepared and admixed to the bulk of the phosphoryl chloride, the phosphorylation reaction proceeds exactly as with added water. Several methods of partially hydrating phosphoryl chloride are known (Meerwein et al., Ber., 62, 1952 (1929); Grunze et al., Angew. Chem., 70, 73 (1958); Wazer et al., J. Am. Chem. Soc., 81, 6360 (1958)). The products obtained are $HPO_2Cl_2$, $H_2PO_3Cl$, orthophosphate, pyrophosphate, polymerized phosphate and its chlorides.

We prepared pure $HPO_2Cl_2$ by the method of Sambeth (J. Angew. Chem., 70, 594 (1958)) and found the compound to have the same effect on the phosphorylation reaction as water.

As shown in Table 1 with reference to inosine which is representative of all ribonucleic acids, the most favorable ratio of water to phosphoryl chloride is between 1:20 and 1:100. More water causes a substantial decrease in the yield. With a molar ratio of phosphoryl chloride to water near one, the yield does not exceed 30% of the nucleotide and the remainder of the nucleoside is decomposed into its components. In the experiments whose results are listed in Table 1, 2',3'-O-isopropylidene inosine was added with stirring to the indicated mixtures of $POCl_3$ and water with and without $FeCl_3$. After 2 and 4 hours an aliquot was taken. It was hydrolyzed, its isopropylidene group was removed, and the produced 5'-inosinic acid was determined by analysis.

TABLE 1

| FeCl₃, percent | Molar ratio H₂O:POCl₃ | Yield of 5'-inosinic acid after— | |
|---|---|---|---|
| | | 2 hours | 4 hours |
| 0 | 0.25:100 | 76 | 77 |
| 0 | 0.5:100 | 80 | 80 |
| 0 | 1:100 | 80 | 82 |
| 0 | 2:100 | 75 | 78 |
| 0 | 3:100 | 50 | 54 |
| 0.01 | 0.5:100 | 86 | 84 |
| 0.01 | 1:100 | 86 | 86 |
| 0.01 | 2:100 | 64 | 72 |
| 0.01 | 3:100 | 52 | 54 |

We have also found that the yield of the reaction between 2',3'-O-protected ribonucleosides and phosphoryl chloride can be substantially increased when the reaction is performed in the presence of an aliphatic alcohol having 1 to 5 carbon atoms.

The effect of tertiary butyl alcohol as compared with that of water is evident from Table 2. In all tests, 1 mole of 2',3'-O-isopropylidene inosine and 17 moles of phosphoryl chloride were employed. The reaction time was 5 hours, and the temperature was 10° C. Yields of 5'-inosinic acid are given in mole percent based on the initial inosine.

TABLE 2

| Additive | Mole ratio of additive to 2',3'-O-isopropylidene inosine | Yield of 5'-inosinic acid | | |
|---|---|---|---|---|
| | | No. 1 | No. 2 | No. 3 |
| Tert-butanol | 1 | 90 | 89 | 87 |
| Water | 1 | 86 | 86 | 85 |
| Tert-butanol | 3 | 79 | 78 | 81 |
| Water | 3 | 54 | 57 | 56 |

It is evident from Table 2 that the yield of the phosphorylation reaction decreases when too much water is added to the reaction mixture. The permissible concentration range of tert-butyl alcohol is broader than that of water.

The following Table 3 lists the results of phosphorylation experiments in which different alcohols were added to a reaction mixture of 1 mole 2',3'-O-isopropylidene inosine and 34 mole phosphoryl chloride.

TABLE 3

| Additive | Mole ratio additive to 2',3'-O-isopropylidene inosine | Yield, percent | |
|---|---|---|---|
| | | 2 hrs., 30° C. | 6 hrs., 5-10° C. |
| Methanol | 1 | 69 | |
| Iso-propyl alcohol | 1 | 59 | 90 |
| Water | 1 | 62 | 82 |
| methanol | 3 | 79 | 80 |
| Iso-propyl alcohol | 3 | 57 | |
| Water | 3 | | 54 |
| methanol | 5 | 77 | |
| Iso-propyl alcohol | 5 | 56 | |
| Water | 5 | 31 | |

The optimum mole ratio of aliphatic lower alcohol to ribonucleoside in the reaction mixture is between 1:1 and 5:1.

Alcohols which increase the yield of 5'-ribonucleotide include methanol, ethanol, propanol, butanol, isoamyl alcohol, and tert-butyl alcohol. Partially substituted phosphoryl chloride derivatives, such as methyl or ethyl phosphorochloridate are also useful for the phosphorylation of 2',3'-O-substituted nucleosides as the aliphatic alcohols.

We have found that the presence of ethers in the reaction mixture is effective in diminishing the decomposition of nucleosides and nucleotides. This effect is believed to be due to the basic character of ethers. They protect the glycoside bonds of nucleosides or nucleotides, especially of purine-ribonucleosides or purine-ribonucleotides, which are unstable in acidic solution.

The effect of diethyl ether on the reaction is shown in Table 4. In these tests, one mole 2',3'-O-isopropylidene inosine and 17 moles phosphoryl chloride were reacted at 10° C. for 5 hours.

TABLE 4

| Amount of water added | Ether | Yield (percent) of 5'-inosinic acid— | | |
|---|---|---|---|---|
| | | Exp. 1 | Exp. 2 | Exp. 3 |
| 1 mole | Added | 92 | 92 | 91 |
| Do | Not added | 86 | 86 | 85 |
| 3 moles | Added | 68 | 69 | 69 |
| Do | Not added | 54 | 57 | 56 |

As is apparent from Table 4, the protective effect of ether is greater as the amount of water is increased. The amount of ether required is about equivalent to that of hydrogen chloride produced during the reaction. A large excess of ether reduces the solubility of the nucleosides and must be avoided. A comparison of the effects of various ethers is shown in Table 5.

TABLE 5

| Moles of ether | Yield (percent) of 5'-inosinic acid— | | |
|---|---|---|---|
| | Dioxane | Ethyl ether | Isopropyl ether |
| 2 | 90 | 87 | 83 |
| 4 | 90 | 85 | 86 |

NOTE.—17 Moles prosphoryl chloride, 3 moles water and one mole 2', 3'-O-isopropylidene inosine were reacted for 5 hours at 10° C. The yield without ether was 64%.

Table 6 shows the results of three dual experiments performed with and without the addition of 1 mole ethyl ether to a reaction mixture containing 1 mole 2',3'-isopropylidene inosine, 17 moles phosphoryl chloride, and 3 moles tert-butyl-alcohol which was held at 10° C. for five hours.

TABLE 6

| Ether | Yield of 5'-inosinic acid— | | |
|---|---|---|---|
| | Exp. 1 | Exp. 2 | Exp. 3 |
| Added | 88 | 86 | 83 |
| Not added | 79 | 74 | 81 |

As is seen from Table 6, the yield of the reaction between 2',3'-O-isopropylidene inosine and phosphoryl chloride is further increased when the reaction is carried out in the simultaneous presence of aliphatic alcohol and ether.

Ethers effective in increasing the yield of 5'-ribonucleotides also include methyl ethyl ether, methyl-n-propyl ether, ethyl-n-butyl ether, and benzyl ethyl ether.

When the reaction is completed, excess phosphoryl chloride can be recovered from the reaction mixture by evaporation in a vacuum, by solvent extraction (ligroin, ether), or by freeze drying. The 2',3'-O-substituted ribonucleoside-5'-phosphorodichloridate obtained and aqueous caustic alkali are added in alternating small batches to water in order to hydrolyze the phosphorodichloridate. The pH of the hydrolysis mixture is held between 6 and 8 in order to minimize the decomposition of the nucleotide. The 2',3'-O-substituted nucleotide can be separated from the mixture by known methods, but this is not necessary for the preparation of the 5'-ribonucleotide. The 2',3'-

O-isopropylidene-ribonucleotides obtained by the hydrolysis release their substituents in positions 2′, 3′ when heated at pH 1.5 to 70° C. in aqueous solution for one hour. The resulting 5′-ribonucleotides separate from the liquid constituents of the mixture in solid form upon concentration or after addition of ethanol.

The preferred protective substituents are 2′,3′-O-alkylidene groups, and especially 2′,3′-O-isopropylidene.

The following examples are further illustrative of the process of the invention, but it will be understood that the invention is not limited thereto.

Example 1

5 grams 2′,3′-O-isopropylidene inosine were added gradually to 50 ml. phosphoryl chloride with stirring. Nitrogen gas was passed through the reaction mixture at room temperature for 5 hours. The excess of phosphoryl chloride was removed under a pressure of less than 15 mm. Hg, and the syrupy residue was poured gradually into 500 ml. ice water alternately with 5 N sodium hydroxide solution so as to maintain the pH of the solution between 6 and 8. The solution was then adjusted to pH 1.5 with hydrochloric acid. It was heated to 70° C. for an hour to hydrolyze the isopropylidene group. The mixture was then neutralized with sodium hydroxide solution, and concentrated to 70 ml. under reduced pressure. Analysis by paper chromatography showed 7 g. (82%) sodium-5′-inosinate 7.5 hydrate to be present in the solution. On cooling in an ice box, 6 g. of the product crystallized (70%).

Example 2

5 grams 2′,3′-O-isopropylidene guanosine and 0.2 g. of ferric chloride were added to 50 ml. phosphoryl chloride with stirring, and nitrogen gas was passed through the mixture at room temperature for 5 hours. The excess of phosphoryl chloride was removed under a pressure of less than 15 mm. Hg, and the viscous residue was poured into 500 ml. ice water alternately with 5 N sodium hydroxide solution, whereby pH of the solution was kept within the range of 6 to 8. The resultant solution was adjusted to pH 1.5 and heated to 70° C. for an hour. The yield was 80%, as determined by paper chromatography. The solution was diluted to 1 l. with water and was passed over a column of a decolorizing resin (Centranol W–1). The column was washed thoroughly with water and 5′-guanylic acid was eluted with 0.5 N acqueous ammonium hydroxide solution. The eluate was concentrated to 70 ml. 100 ml. ethanol were added, and the mixture was left in an ice box. The gel-like precipitate formed was collected by centrifuging, and was purified by dissolution in water, decolorizing, and precipitation by alcohol. The sodium-5′-guanylate obtained weighed 5.2 g. which was 82% of the theoretical yield.

Example 3

5 grams 2′,3′-O-isopropylidene inosine and 0.2 g. aluminum chloride were added to 50 ml. phosphoryl chloride, and dry air was passed through the mixture for 5 hours. The excess of phosphoryl chloride was evaporated under reduced pressure, and the residue was hydrolyzed as described in Example 1. The solution obtained was heated at pH 1.5 to 70° C. for an hour, neutralized, and concentrated to 70 ml. 6.85 g. of sodium-5′-isosinate 7.5 hydrate were obtained. The yield as determined by paper chromatography was 80%.

Example 4

20 grams phosphoryl chloride were mixed with 0.03 ml. water, 3 mg. ferric chloride, and 1 gram of 2′,3′-O-isopropylidene inosine. The mixture was stirred for 2 hours at 5 to 20° C. 50 ml. ether were added to the resultant solution to extract the excess phosphoryl chloride, and the material insoluble in ether was dissolved in 100 ml. water. The solution was adjusted to pH 1.5 and heated to 70° C. for an hour. It was then cooled, neutralized and concentrated to 20 ml. Ethanol was added to precipitate sodium-5′-inosinate which weighed 1.35 grams. The yield as determined by paper chromatography was 85%.

Example 5

One gram 2′,3′-O-isopropylidene guanosine and 0.1 ml. of water were added to 20 ml. phosphoryl chloride, and the mixture was stirred for 5 hours at 5 to 20° C. The reaction mixture was frozen in a Dry Ice-alcohol mixture, and the excess of phosphoryl chloride was recovered by freeze-drying. The residue was dissolved in 100 ml. water, and the solution was adjusted to pH 1.5 with aqueous sodium hydroxide solution. It was then heated to 75° C. for an hour to remove the isopropylidene group. The solution was neutralized after cooling and concentrated to 20 ml. Sodium-5′-guanylate was precipitated by the addition of acetone, centrifuged, washed with acetone, and dried. The yield was 0.97 gram which are 77% of the theoretical amount.

Example 6

One gram 2′,3′-O-isopropylidene adenosine and 0.1 ml. water were added to 20 ml. phosphoryl chloride. The mixture was stirred for 5 hours at 5 to 20° C. Ether was added, and the precipitate formed thereby was separated from the liquid phase by centrifuging, washed with ether, and dissolved in 100 ml. water. The aqueous solution was heated at pH 1.5 to 75° C. for an hour and was cooled. The cooled solution was neutralized and concentrated. Ethanol was added to precipitate sodium-5′-guanylate which weighed 0.9 g. (71%).

Example 7

One gram 2′,3′-O-isopropylidene adenosine and 0.65 gram ortho-phosphoric acid were added to 20 ml. phosphoryl chloride and stirred for 5 hours at 15° C. Ether was added to the mixture, and the precipitate formed was separated from the remaining liquid by centrifuging, washed with ether, and dissolved in 100 ml. water. The aqueous solution was heated at pH 1.5 to 75° C. for an hour and cooled. Neutralization, concentration, and addition of ethanol gave sodium-5′-adenylate which weighed 0.75 gram (59%).

Example 8

0.02 ml. water were added at −10° C. to 250 mg. pyrophosphoric acid tetra-chloride ($P_2O_3Cl_4$). 0.2 ml. phosphoryl chloride followed by 1 g. 2′,3′-O-isopropylidene inosine were admixed, and the mixture obtained was stirred for 5 hours at 10 to 20° C. Ether was added to extract unreacted phosphoryl chloride. The solid residue was washed with ether and dissolved in 100 ml. water. The solution was adjusted to pH 1.5, heated for an hour, and cooled. Neutralization, concentration to 26 ml., and addition of ethanol yielded 1.5 g. sodium-5′-inosinate 7.5 hydrate (88%).

Example 9

3.2 grams 2′,3′-O-isobutylidene adenosine and 2 ml. tert-butyl alcohol were added to 15 ml. phosphoryl chloride, and the mixture was kept at 5° C. for 7 hours. The excess of phosphoryl chloride was evaporated under reduced pressure in an acetone-Dry Ice bath. The syrupy residue was poured into ice water. The aqueous solution was adjusted with caustic alkali solution to pH 1.5, and heated to 70° C. for 20 minutes in order to hydrolyze the isobutylidene substituent. The reaction mixture was neutralized and concentrated. The pH of the resulting solution was adjusted to 8. Sodium-5′-adenylate was crystallized out by adding alcohol. The crystals weighed 2.9 g. The yield was 75%.

Example 10

3.1 grams isopropylidene inosine, 9 ml. tert-butyl alcohol and 0.1 ml. water were added to 41 ml. phosphoryl chloride, and the mixture was kept at 10° C. Upon further processing as in Example 9, 4.1 g. sodium-5'-inosinate were obtained. The yield was 85%.

*Example 11*

The procedure of Example 10 was repeated but 0.2 ml. water were used instead of 0.1 ml. 4.09 grams sodium-5'-inosinate were obtained.

*Example 12*

3.5 grams cyclohexylidene inosine, 2 ml. tert-butyl alcohol, and 3 ml. dioxane were added to 15 ml. phosphoryl chloride, and the mixture was kept at 10° C. for 5 hours. The excess of phosphoryl chloride was distilled off at 5–10° C., and the residue was hydrolyzed. Sodium hydroxide solution was added, and the pH of the solution so obtained was adjusted to 1.5. The cyclohexylidene substituent was removed by heating to 70° C. for 20 minutes. The reaction mixture was neutralized with sodium hydroxide solution and concentrated. The pH of the solution was adjusted to 8. Sodium-5'-inosinate was crystallized out by adding alcohol. The crystals weighed 4.1 g.

*Example 13*

2 milliliters diethyl ether, 0.2 ml. water, and 3 g. 2',3'-O-isopropylidene adenosine were added to 15 ml. phosphoryl chloride, and the mixture was stirred for 5 hours at 10° C. 33 ml. ether were added to dissolve the unreacted phosphoryl chloride. The insoluble material was filtered off, washed with 13 ml. ether, and dissolved in 200 ml. water. The aqueous solution was adjusted to pH 1.5 and heated to 75° C. for 20 minutes. The reaction mixture was neutralized with aqueous sodium hydroxide solution, and the desired product was precipitated with ethanol. 3 grams sodium-5'-adenylate were obtained (79%).

*Example 14*

2 milliliters ethyl ether, 0.1 ml. water, and 3.2 g. 2',3'-O-isopropylidene guanosine were added to 15 ml. phosphoryl chloride, and the mixture was stirred for 6 hours at 5° C. 40 ml. ether were added to the resulting solution, and the precipitate formed was separated from the liquid and washed with 40 ml. ether. It was then dissolved in ice water. The aqueous solution was adjusted to pH 1.5, and heated to 70° C. for 20 minutes. After neutralization and concentration, the desired product was precipitated by the addition of acetone. The yield of sodium-5'-guanylate was 3.3 g. (80%).

*Example 15*

One gram 2',3'-O-isopropylidene uridine and 0.06 ml. of water were added to 17.6 ml. phosphoryl chloride, and the mixture was stirred for 20 hours at 5° to 10° C. Ether was added, and the precipitate formed was separated by centrifuging, washed with ether, and dissolved in 100 ml. water. The acidic solution was neutralized to pH 1.5 with aqueous sodium hydroxide solution, and heated for an hour to 75° C. The solution was then cooled, neutralized, concentrated, and mixed with ethanol to precipitate sodium-5'-uridylate which weighed 0.71 g. (55%).

*Example 16*

One gram 2',3'-O-isopropylidene cytidine and 0.06 ml. of water were added to 18 ml. phosphoryl chloride. The mixture was kept at 10° C. for 8 hours and was then worked up in the manner described in Example 15. 0.8 gram sodium-5'-cytidilate (61%) were obtained.

*Example 17*

One gram 2',3'-O-isopropylidene xanthosine and 0.3 ml. tert-butyl alcohol were added to 20 ml. phosphoryl chloride, and the mixture was stirred for 5 hours at 5° C. When further processed as in Example 15, it yielded 0.61 g. sodium-5'-xanthylate (49%).

*Example 18*

One gram 6-chloro-9-(2',3'-O-isopropylidene)-ribofuranosyl-purine and 0.3 ml. tertiary butyl alcohol were added to 20 ml. phosphoryl chloride, and the mixture was stirred for 20 hours at 5° C. The reaction mixture was solidified in a Dry Ice-alcohol bath, and the excess of phosphoryl chloride was recovered by freeze-drying. The residue was dissolved in 50 ml. ice water, and the aqueous solution was adjusted to pH 1.5 with aqueous sodium hydroxide solution. It was then heated to 75° C. for an hour. The solution was cooled, neutralized, and concentrated, and acetone was added to precipitate sodium-6-chloro-9-ribofuranosylpurine-5'-phosphate which weighed 0.8 g. (63%).

*Example 19*

Two grams 2,6-dichloro-9-(2',3'-O-isopropylidene)-ribofuranosyl-purine and 0.04 ml. water were added to 40 ml. phosphoryl chloride, and the mixture was stirred for 20 hours at 5° C. After further processing as in Example 18, 1.62 g. sodium-(2,6-dichloro-9-ribofuranosylpurine)-5'-phosphate (66%) were obtained.

*Example 20*

Two grams 2',3'-O-(1,2-dimethylpropylidene)inosine and 0.05 ml. water were added to 30 ml. phosphoryl chloride, and the mixture was stirred for 20 hours at 5° C. It was worked up as in Example 15, and 1.8 g. sodium-5'-inosinate (78%) were obtained.

*Example 21*

Two grams 2',3'-O-undecylidene inosine and 0.05 ml. water were added to 30 ml. phosphoryl chloride, and the mixture was stirred for 7 hours. It was then treated in the manner of Example 15, and 1.35 g. sodium-5'-inosinate (72%) were obtained.

*Example 22*

Two grams 2',3'-O-cyclopentylidene uridene and 0.1 ml. water were added to 30 ml. of phosphoryl chloride, and the mixture was stirred for 7 hours. It was further treated as in Example 15, and 1.66 g. sodium-5'-uridylate (70%) were obtained.

While the invention has been described with particular reference to specific embodiments, it is to be understood that it is not limited thereto, but is to be construed broadly and restricted solely by the scope of the appended claims.

What we claim is:

1. A process for preparing a 5'-ribonucleotide which comprises:
    (a) dissolving a 2',3'-O-substituted ribonucleoside in a medium mainly consisting of phosphoryl chloride,
        (1) the substituent in said ribonucleoside being selected from the group consisting of the divalent alkylidene and cycloalkylidene radicals;
    (b) maintaining the resulting solution at a temperature between 0° C. and 30° C. until the corresponding 2',3'-O-substituted ribonucleoside-5'-phosphorodichloridate is formed; and
    (c) hydrolyzing said 2',3'-O-substituted ribonucleoside-5'-phosphorodichloridate to the corresponding nucleotide.

2. A process as set forth in claim 1, wherein said ribonucleoside has a constituent ribose part and a constituent base part, said base part being selected from the group consisting of purine and pyrimidine bases.

3. A process as set forth in claim 2, wherein said purine base is selected from the group consisting of 6-chloropurine, 2,6-dichloropurine xanthine, hypoxanthine, adenine, and guanine.

4. A process as set forth in claim 1, wherein said divalent alkylidene radical is a lower alkylidene radical.

5. A process as set forth in claim 1, wherein said divalent alkylidene radical is the isopropylidene radical.

6. A process as set forth in claim 1, wherein said medium further includes a member of the group consisting of water, partially hydrated phosphoryl chloride, an aliphatic alcohol having one to five carbon atoms, and phosphoryl chloride, partially substituted by the radical of an aliphatic alcohol having one to five carbon atoms.

7. A process as set forth in claim 6, wherein said medium further includes an ether selected from the group consisting of di-lower-alkyl ethers, dioxane, and benzyl-lower alkyl-ethers.

8. A process as set forth in claim 6, wherein said member is water, and is present in said medium in a molar amount between $\frac{1}{20}$ and $\frac{1}{100}$ of the molar amount of said phosphoryl chloride.

9. A process of phosphorylating a 2',3'-O-substituted nucleoside which comprises:
 (a) dissolving a 2',3'-O-substituted ribonucleoside in a medium mainly consisting of phosphoryl chloride,
  (1) the substituent in said ribonucleoside being selected from the group consisting of the divalent alkylidene and cycloalkylidene radicals; and
 (b) maintaining the resulting solution at a temperature between 0° C. and 30° C. until the corresponding 2',3' - O - substituted ribonucleoside - 5' - phosphorodichloridate is formed.

References Cited by the Examiner

UNITED STATES PATENTS

| 2,482,069 | 9/1949 | Ruskin | 260—211.5 |
| 2,645,637 | 7/1953 | Todd | 260—211.5 |

FOREIGN PATENTS

| 1,119,278 | 12/1961 | Germany. |
| 621,094 | 4/1949 | Great Britain. |

LEWIS GOTTS, *Primary Examiner.*

J. R. BROWN, P. A. STITH, J. R. GENTRY,
*Assistant Examiners.*